United States Patent [19]
Isaacson

[11] 3,770,323
[45] Nov. 6, 1973

[54] VEHICLE JACK

[75] Inventor: Manfred A. Isaacson, Pontiac, Mich.

[73] Assignee: General Motors Corporation, Detroit, Mich.

[22] Filed: Sept. 14, 1971

[21] Appl. No.: 180,406

[52] U.S. Cl. ............... 301/38 R, 254/86 R, 254/94
[51] Int. Cl. ........................................... B60b 11/00
[58] Field of Search ............... 301/38, 5, 5 B, 5 BA, 301/39 R; 254/94, 86 R

[56] References Cited
UNITED STATES PATENTS

| | | | |
|---|---|---|---|
| 862,422 | 8/1907 | Treadgold | 301/38 R |
| 1,263,375 | 4/1918 | Clarke | 301/38 R |
| 1,270,407 | 6/1918 | Grainger | 254/94 |
| 2,257,543 | 9/1941 | Toby | 301/39 R |
| 3,295,894 | 1/1967 | Perry | 301/38 R |
| 3,298,665 | 1/1967 | Sieloff | 254/94 |
| 3,679,267 | 7/1972 | Zachmann | 301/38 R |

OTHER PUBLICATIONS
Rothbart, "CAMS", pages 135-140, Jan. 23, 1957.

Primary Examiner—Richard J. Johnson
Assistant Examiner—Reinhard J. Eisenzopf
Attorney—W. E. Finken et al.

[57] ABSTRACT

A vehicle jack includes a cam member adapted to be secured by a pair of nut and bolt arrangements to a first spare wheel segment mounted on a vehicle wheel housing carrying a flattened tire. The cam member mounts an elongated ground engaging friction member that extends circumferentially about the wheel housing axis with the configuration substantially of a logarithmic spiral for a predetermined circumferential angle. One end of the logarithmic spiral portion is positioned radially inward of the wheel housing to allow mounting of the jack without ground interference, while the other end is positioned adjacent the ground engaging surface of the first spare wheel segment. An initial rotational movement of the wheel housing moves the one end of the logarithmic spiral portion into ground engagement with a predetermined friction angle between the ground and a radius vector from the wheel housing axis to the point of ground engagement. During continued rotational movement of the wheel housing through the predetermined circumferential angle, the logarithmic spiral portion rolls along the ground and the jack lifts the wheel housing while the friction angle remains generally constant to minimize the maximum frictional force developed between the ground and the friction member. This minimization reduces the possibility of slippage between the friction member and the ground to ensure effective operation of the jack. Further rotational movement of the wheel housing moves the first spare wheel segment into ground engagement as the other end of the logarithmic spiral portion moves out of ground engagement, allowing detachment of the jack and mounting of a cooperable second spare wheel segment to provide a spare wheel that allows vehicle use prior to repair of the flattened tire.

5 Claims, 6 Drawing Figures

INVENTOR.
Manfred A. Isaacson
BY
Herbert Furman
ATTORNEY

VEHICLE JACK

This invention relates to a vehicle jack that includes a cam member adapted to be pivoted to a vehicle and supporting a friction member engageable with the ground to lift the vehicle during rotation of the cam member.

It is known to provide a vehicle jack including a cam member adapted to be freely pivoted to a vehicle and mounting a ground engaging friction member. To begin the jacking operation, an initial rotational movement is supplied to the cam member to move the friction member into ground engagement. Subsequent operation of the vehicle and the resultant longitudinal vehicle movement causes the friction member to roll along the ground, rotating the cam member such that the jack lifts the vehicle. It is also known to provide such a jack in which the cam member is mounted on either a driving or freely rotatable vehicle wheel housing. When the cam member is mounted on a freely rotatable wheel housing, the jacking operation is similar to that previously described. When the cam member is mounted on a driving wheel housing, the impetus for the rotation of the cam member is from the wheel housing and the cam member rotation is the impetus for the longitudinal vehicle movement and lifting of the vehicle.

With this type of jack, a normal force equal to the lifted weight of the vehicle acts upwardly on the friction member at the point of ground engagement. Acting on a lever arm equal to the horizontal component of a radius vector from the pivotal axis of the cam member to the point of ground engagement, this normal force produces a normal torque tending to rotate the cam member in the opposite direction to the rotational direction causing lifting. To counteract this normal torque, a frictional force is developed between the friction member and the ground. Acting on a lever arm equal to the vertical component of the previously described radius vector, this frictional force produces a counteracting frictional torque. As long as the normal torque is sufficiently small such that the frictional force developed does not have to exceed the normal force multiplied by the coefficient of friction between the ground and the friction member, no slippage between the friction member and the ground will occur and the cam member will rotate causing the jack to lift the longitudinally moving vehicle. However, if the normal torque exceeds this limit, the friction member and ground will be unable to develop the required frictional force to produce the corresponding frictional torque for counteracting the normal torque and slippage will occur. If the cam member is freely pivoted to the vehicle or mounted on a freely rotatable wheel housing such that the longitudinal movement of the vehicle produces the rotation of the cam member, this slippage will prevent the rotation of the cam member and the consequent lifting of the vehicle by the jack. If the cam member is mounted on a driving wheel housing, the cam member will still be rotated such that the jack lifts the vehicle, but the slippage between the friction member and ground will cause excessive wear to the friction member.

Generally, with jacks of this type, the friction angle between the ground and a radius vector from the pivotal axis of the cam member to the point of ground engagement increases as lifting proceeds and the point of ground engagement moves toward a vertical line through the pivotal axis of the cam member. Consequently, the normal force initially acts on a longer lever arm than during later stages to initially produce a relatively large normal torque. Since the frictional force initially acts on a shorter lever arm than during later stages, it must be relatively large to provide the required counteracting frictional torque preventing slippage. This initial peaking of the frictional force may prevent effective operation of the jack, as previously described, if the friction member and ground are unable to develop the required frictional force.

This invention provides an improved vehicle jack with a cam member adapted to be pivoted to a vehicle and mounting a friction member whose engagement with the ground minimizes the maximum frictional force by maintaining the force relatively constant during lifting to prevent slippage between the friction member and the ground.

In the preferred embodiment of the invention, the jack includes a cam member adapted to be releasably attached to a spare wheel segment mounted on a wheel housing carrying a flattened tire. The cam member supports a friction member with the configuration substantially of a logarithmic spiral for a predetermined circumferential angle. The logarithmic spiral portion of the friction member has one end positioned radially inward of the wheel housing and another end positioned substantially adjacent the ground engaging surface of the spare wheel segment. Rotational movement of the wheel housing moves the one end of the logarithmic spiral portion into engagement with the ground with a predetermined friction angle between the ground and a radius vector from the wheel housing axis to the point of ground engagement. The logarithmic spiral portion rolls along the ground and the jack lifts the wheel housing during continued rotational movement through the predetermined circumferential angle while the friction angle remains generally constant, thus minimizing the maximum frictional force developed between the ground and the friction member during the lifting of the vehicle to prevent relative slippage therebetween. Further rotational movement of the wheel housing moves the spare wheel segment into engagement with the ground to allow removal of the jack and mounting of a cooperable second spare wheel segment, providing a spare wheel that allows vehicle use prior to repair of the flattened tire carried by the wheel housing.

Accordingly, one feature of this invention is that it provides an improved vehicle jack with a cam member adapted to be pivoted to a vehicle and mounting an elongated ground engaging friction member that extends circumferentially about the pivotal axis with the configuration substantially of a logarithmic spiral for a predetermined circumferential angle. Another feature of this invention is that the cam member may be mounted on a vehicle wheel housing carrying a flattened tire, with one end of the logarithmic spiral portion positioned radially inward of the wheel housing and the other end positioned substantially adjacent the ground engaging surface of a wheel housing mounted spare wheel segment. A further feature of this invention is that the cam member may be removable from the wheel housing to allow mounting of a cooperable second spare wheel segment providing a spare wheel allowing vehicle operation prior to repair of the flattened tire.

These and other features of this invention will be readily apparent from the following detailed description and drawings in which.

Figure 1:
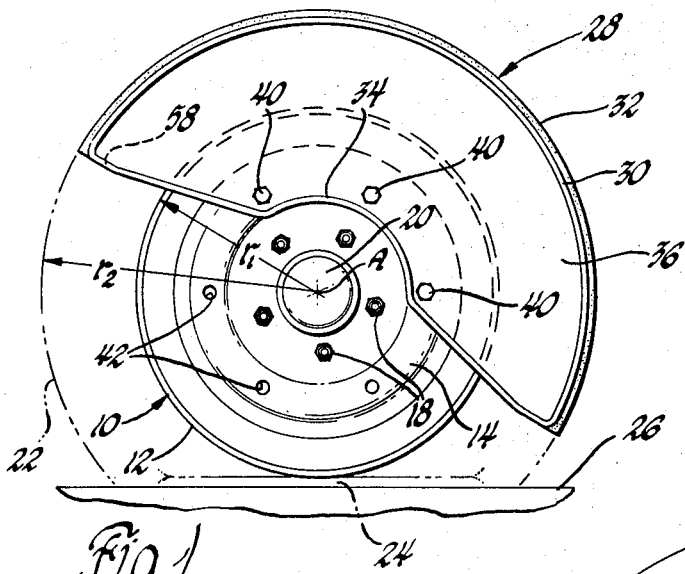
FIG. 1 is a view of a vehicle wheel housing carrying a flattened tire and mounting a generally semicircular spare wheel segment on the upper portion.
Figures 4, 5, 6:
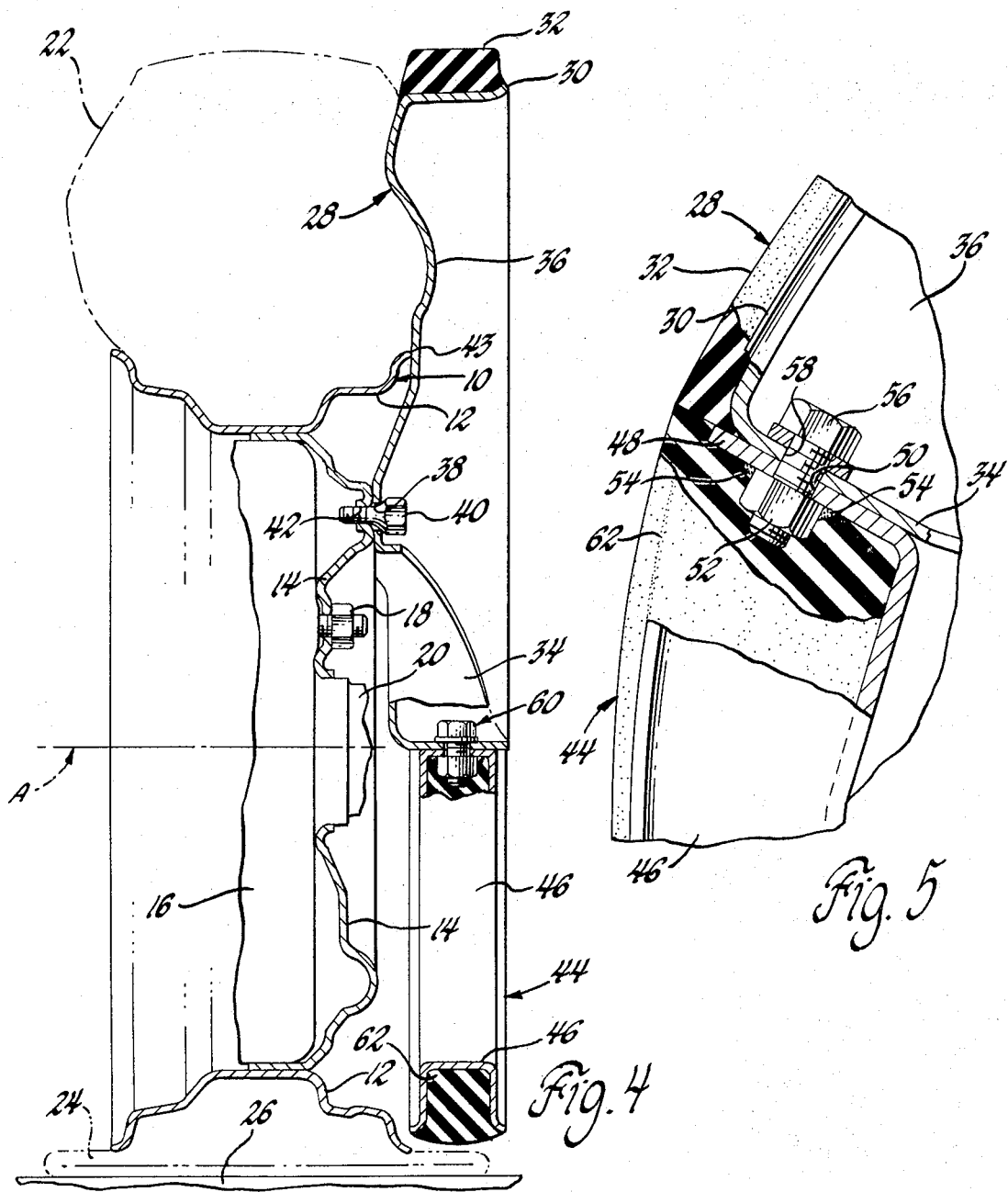
FIG. 4 is an enlarged partially broken away sectional view taken generally along line 4—4 of FIG. 2.
FIG. 5 is an enlarged partially broken away view of a portion of FIG. 2 showing the attachment of one of the ends of the jack to the spare wheel segment.
FIG. 6 is a schematic view showing the forces acting on the jack during lifting of the wheel housing.

Referring to the drawings and more particularly to FIGS. 1 and 4, a vehicle wheel housing generally indicated by 10 conventionally includes a rim member 12 to which is conventionally secured an annular generally plate-like center member 14. As seen in FIG. 4, the wheel housing is conventionally mounted on a wheel hub 16 and is secured in position by the usual stud and nut arrangements 18 to thus mount the wheel housing for rotational movement about the axis A of axle 20. As can be seen in FIG. 1, rim member 12 has an outer edge radius $r_1$ and conventionally mounts a phantom line indicated tire 22 which when inflated has an outer radius $r_2$ slightly larger than the rolling radius of the lower portion of the tire that becomes slightly flattened due to ground engagement. As shown, tire 22 has developed a leak and become flattened such that a lower tire portion 24 is pinched between the rim member 12 and the ground 26. It should be noted that throughout this application, the term "ground" means any road-like surface whether composed of concrete, asphalt, gravel, wood, or dirt, etc. A 180° spare wheel segment is generally indicated by 28 and includes a 180° outer flange 30 to which is suitably bonded a 180° spare tire segment 32. Wheel segment 28 also includes an inner flange 34 that extends between the ends of flange 30 and includes a curved center portion generally concentric with the axis A in spaced relationship to axle 20. Between the flanges 30 and 34 the wheel segment includes a generally semicircular center portion 36 with apertures 38, see FIG. 4, for receiving nuts 40 threadedly engaged with apertures 42 in the center member 14 of wheel housing 10. FIG. 4 also shows the manner in which the center portion 36 of wheel segment 28 engages the axial outer edge of rim member 12 at 43 such that the wheel segment is securely positioned relative to the wheel housing. While not shown in the drawings, it is also possible to construct the wheel segment with the central portion of flange 34 spaced closer to axle 20 than shown, and with the center portion 36 apertured such that stud and nut arrangements 18 mount both the wheel housing 10 and the wheel segment.

Figure 2:
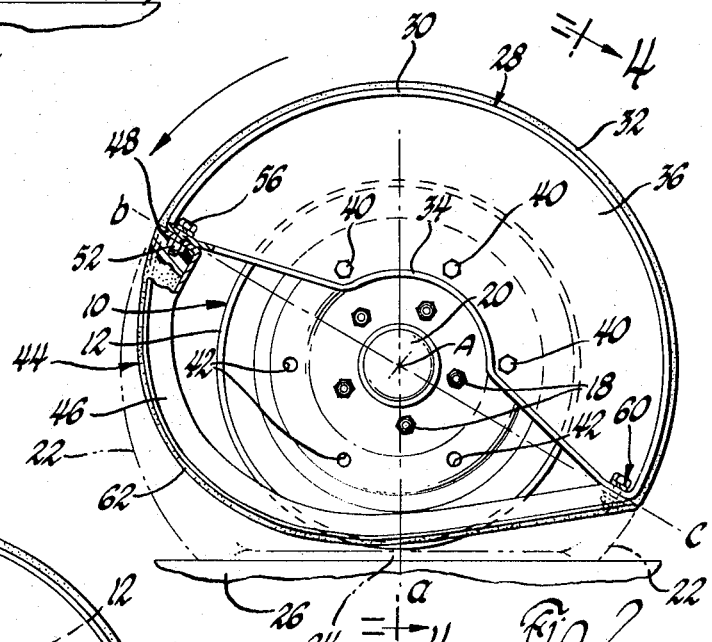
FIG. 2 is a view similar to FIG. 1 showing a vehicle jack, according to this invention, secured to the spare wheel segment and adaptable to roll along the ground and lift the wheel housing during rotational movement in the direction of the counterclockwise pointing arrow.

Referring to FIG. 2, a vehicle jack, according to this invention, is generally indicated by 44 and includes a curved generally elongated cam member 46 with a generally channel shaped cross section, see the lower portion of FIG. 4. The upper left-hand end of cam member 46 includes an integral flange 48, see FIG. 5 additionally, with an aperture 50. A nut 52 is secured to flange 48 by welds 54 and is located concentric with the aperture 50. A bolt 56 is received within an aperture 58 in the outer end of flange 34 of wheel segment 28 and is threadedly received by nut 52 to secure the upper left-hand end of cam member 46 to the wheel segment. The lower right-hand end of cam member 46 is secured to the opposite end of the wheel segment in a similar manner by a nut and bolt arrangement generally indicated by 60 to thus fix the cam member relative to the wheel housing 10. As best seen in FIG. 4, a generally elongated ground engaging friction member 62 is received within the channel shaped cross section of cam member 46 and is adhesively bonded thereto, extending circumferentially about axis A for 180°. As best seen in FIG. 6, between a radius $a$ extending from axis A of axle 20 through an outer lower right-hand portion of jack 44 and a radius $b$ extending from axis A through the one end of cam member 46, an included angle of 120° is defined while the radial distance of the outer ground engaging surface of friction member 62 increases from $r_1$ to $r_2$ generally in the configuration of a logarithmic spiral, as will be more fully hereinafter described. Between radius $a$ and a radius $c$ through the other end of jack 44, an angle of 60° is defined and the outer surface of friction member 62 has a generally rectilinear configuration. Adjacent radius $a$, see FIG. 2, a portion of the mounted jack 44 is positioned radially inward of the outer edge of rim member 12. This positioning allows mounting of the jack without ground interference subsequent to vehicle operation positioning the wheel housing 10 with a selected set of apertures 42 generally in the angular position shown.

Figure 3:
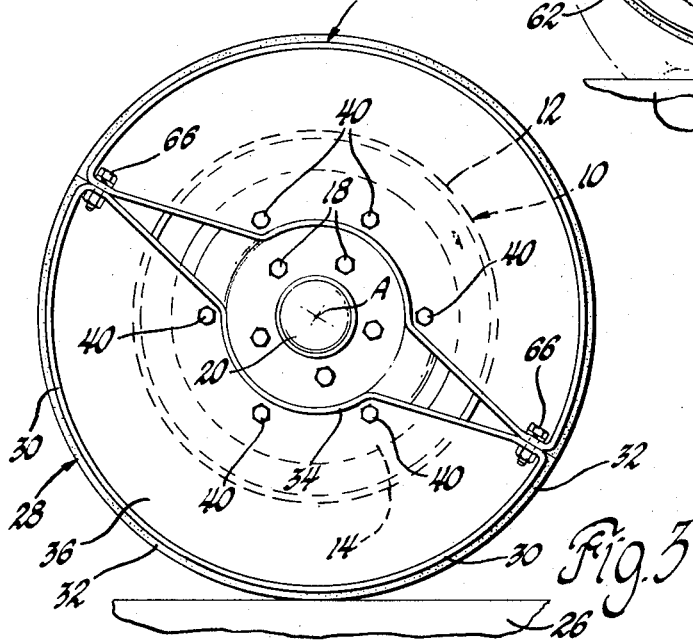
FIG. 3 is a view showing the wheel housing rotated approximately 180° from the position of FIG. 2 where the jack has lifted the wheel housing onto the wheel segment and has been detached to allow mounting of a second spare wheel segment that cooperates with the first spare wheel segment to provide a spare wheel.

After the spare wheel segment 28 and the jack 44 have been mounted relative to the wheel housing in the FIG. 2 position, the vehicle is operated to rotate the assembly in the counterclockwise direction of the arrow of FIG. 2. If axle 20 is a driving axle, the impetus for this rotation is the axle rotation, while longitudinal vehicle movement resulting from the driving rotation of other driving wheels and the resultant frictional force developed by ground engagement rotates the asembly if axle 20 is not a driving axle. Upon the initial rotational movement of the assembly, friction member 62 first pinches the flattened portion of tire 22 and then moves into engagement with the ground 26. After rotating approximately 120°, the spare tire segment 32 of spare wheel segment 28 engages the ground and thus supports the wheel housing at substantially the same height as does the tire 22 when inflated. The assembly is then rotated slightly further, such as to the FIG. 3 position where wheel segment 28 is 180° from the FIG. 2 position, and jack 44 is detached from the wheel segment 28 by detaching the bolts at the ends of cam member 46. A second spare wheel segment 64 is then attached to the center member 14 of wheel housing 10 by bolts 40 in the same manner as wheel segment 28. The ends of the spare wheel segments are then secured to each other by nut and bolt arrangements 66, providing a spare wheel allowing vehicle use prior to repair of tire 22.

FIG. 6 shows a schematic view of the jack 44 during an intermediate stage of lifting the wheel housing 10. In this position, the ground 26 is engaged by the logarithmic spiral portion of friction member 62 at the outer end of a radius vector r and is tangent to the jack 44, defining an included angle α with the radius vector r. Since the characteristic of a logarithmic spiral is that a tangent to the curve at any point makes a constant angle with the corresponding radius vector to that point, the angle α remains constant for any rotational position where the logarithmic spiral portion of friction member 62 engages the ground. A normal force N corresponding to the lifted weight of the vehicle acts downwardly on the jack 44 through the axis A of axle 20 and a corresponding normal force N acts upwardly on the logarithmic spiral portion of friction member 62 at the point of ground engagement. The upwardly acting normal force N operates on a lever arm equal to r cosineα to provide a normal torque tending to rotate the jack 44 clockwise. This torque tends to cause slippage between the jack 44 and the ground 26. If axle 20 is a nondriving axle, this slippage will cause the jack to skid along the ground without rotating and lifting the wheel housing; while if axle 20 is a driving axle, the jack will rotate and lift the wheel housing but the friction member 62 will wear excessively as it skids along the ground. To counteract the normal torque and prevent slippage of the jack relative to the ground, a frictional force $f$ is developed at the point of ground engagement and acts tangentially on the jack to cause a counterclockwise rotation. The frictional force $f$ thus operates on a lever arm equal to $r$ sine $\alpha$ to provide a frictional torque about axis A of a magnitude equal to the normal torque. What has been described can be shown mathematically by the following:

$$N\, r\, \cosine\, \alpha = f\, r\, \sine\, \alpha \quad (1)$$

which is equivalent to

Equation No. 2: $f = N\, \cotangent\, \alpha$ \quad (2)

Since angle α is constant through the rotational movement where the logarithmic spiral portion of friction member 62 engages the ground, the friction force $f$ is constant throughout the lifting of the wheel housing. Consequently, the maximum frictional force $f$ developed is minimized and no excessively large frictional force is developed during the initial stages of lifting such that slippage results.

The invention thus provides an improved vehicle jack. What is claimed is:

1. A vehicle jack comprising, a cam member, means adapted to mount the cam member relative to a vehicle for rotational movement about a transverse vehicle axis, and an elongated ground engaging friction member mounted on the cam member extending circumferentially about the transverse vehicle axis and including a ground engaging surface with the configuration of a logarithmic spiral for a circumferential angle of approximately 120°, the logarithmic spiral portion of the friction member being engageable with the ground with a predetermined friction angle between the ground and a radius vector from the rotational axis to the point of ground engagement, the logarithmic spiral portion of the friction member rolling along the ground to lift the vehicle during rotational movement of the cam member through the circumferential angle while the friction angle remains generally constant to minimize the maximum frictional force developed between the ground and the friction member and thus prevent slippage therebetween.

2. A vehicle jack comprising, a cam member, means adapted to mount the cam member on a vehicle wheel housing, and an elongated ground engaging friction member mounted on the cam member extending circumferentially about the wheel housing axis and including a ground engaging surface with the configuration of a logarithmic spiral for a circumferential angle of approximately 120°, the logarithmic spiral portion of the friction member having one end positioned radially inward of the wheel housing to allow mounting of the cam member without ground interference, the one end of the logarithmic spiral portion being engageable with the ground with a predetermined friction angle between the ground and a radius vector from the wheel housing axis to the point of ground engagement, the logarithmic spiral portion of the friction member rolling along the ground to lift the wheel housing during rotational movement thereof through the circumferential angle while the friction angle remains generally constant to minimize the maximum frictional force developed between the ground and the logarithmic spiral portion and thus prevent slippage therebetween.

3. A vehicle jack comprising, a cam member, means adapted to removably mount the cam member on a vehicle wheel housing, and an elongated ground engaging friction member mounted on the cam member extending circumferentially about the wheel housing axis and including a ground engaging surface with the configuration of a logarithmic spiral for a circumferential angle of approximately 120°, the logarithmic spiral portion of the friction member having one end positioned radially inward of the wheel housing to allow mounting of the cam member without ground interference and having the other end thereof positioned radially outward of the wheel housing so as to be positionable substantially adjacent the ground engaging surface of a wheel housing mounted spare wheel segment, the one end of the logarithmic spiral portion being engageable with the ground with a predetermined friction angle between the ground and a radius vector from the wheel housing axis to the point of ground engagement, the logarithmic spiral portion rolling along the ground to lift the wheel housing during rotational movement thereof through the circumferential angle while the friction angle remains generally constant to minimize the maximum frictional force developed between the ground and the logarithmic spiral portion and thus prevent slippage therebetween, further rotational movement of the wheel housing moving the spare wheel segment into engagement with the ground to thus support the wheel housing and allow removal of the jack and mounting of another spare wheel segment on the wheel housing.

4. The vehicle jack of claim 3 wherein the other end of the logarithmic spiral portion is spaced from the wheel housing axis by a distance substantially equal to the rolling radius of a tire adapted to be supported by the wheel housing.

5. The vehicle jack of claim 3 wherein the cam member is adapted to be mounted on the spare wheel segment and thus fixed relative to the wheel housing.

* * * * *